US006629751B2

United States Patent
Giere et al.

(10) Patent No.: US 6,629,751 B2
(45) Date of Patent: Oct. 7, 2003

(54) METHOD AND SYSTEM FOR REDUCING BANDING EFFECTS IN A PRINTING SYSTEM

(75) Inventors: Matthew D. Giere, San Diego, CA (US); William Edward Bland, Cardiff, CA (US); Chris Wykoff, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/894,584

(22) Filed: Jun. 28, 2001

(65) Prior Publication Data

US 2003/0001910 A1 Jan. 2, 2003

(51) Int. Cl.[7] ................................. B41J 2/145
(52) U.S. Cl. ................. 347/41; 347/40; 347/9
(58) Field of Search ................. 347/47, 62, 9, 347/19, 40, 41

(56) References Cited

U.S. PATENT DOCUMENTS

| 4,272,771 A | * | 6/1981 | Furukawa | 346/75 |
| 5,923,344 A | * | 7/1999 | Norum et al. | 347/9 |
| 6,142,598 A | * | 11/2000 | Iwasaki et al. | 347/9 |
| 6,231,160 B1 | * | 5/2001 | Glass | 347/40 |

* cited by examiner

Primary Examiner—Judy Nguyen
Assistant Examiner—Lam Nguyen

(57) ABSTRACT

An image reproduction system with requisite technology to reduce or eliminate altogether banding effects is provided. The system includes an input tray for storing print media, an output area for holding printed media and an inkjet pen or printhead for printing information on the print media. In a preferred embodiment, the reproduction system is inkjet printer whose pen scans and ejects ink on the print media with a non-uniform dot pitch. This non-uniformity is achieved by adding visual noise in a known and predictable fashion to the uniform dot pitch.

9 Claims, 6 Drawing Sheets

METHOD AND SYSTEM FOR REDUCING BANDING EFFECTS IN A PRINTING SYSTEM

FIELD OF THE INVENTION

The invention relates generally to an inkjet printer; and more generally, to a method and system for reducing banding effects in such printers.

BACKGROUND OF THE INVENTION

In designing a printer, it is important to provide as economically and simply as possible a relatively high output quality at a relatively high speed. The output quality of the printer is a function of its printhead resolution (i.e., the ability to resolve or separate, often visually, two image elements or details). The finer the resolution, the better the print quality.

The resolution of the printhead of an inkjet printer is directly related to its nozzle pitch (i.e., distance between adjacent nozzles on the printhead). This distance is typically designed to be uniform. This generally translates into having a uniform dot pitch (i.e., distance between adjacent dots in a printout). One disadvantage of a uniform dot pitch is the inability to hide printing errors. For example, to print on a print medium, nozzles of the inkjet printer eject tiny droplets of ink, or dots, during each horizontal pass of the printhead over the print medium to form a row of dots. (Each horizontal pass of a printhead over a print medium is called a swath.) After each preceding swath, the print medium is incrementally advanced to allow room for the next row of dots. Through a succession of rows of dots, images or letters are printed on the print medium.

Each dot has a uniform diameter and is placed at a uniform distance from each other on the print medium and each preceding row of dots is placed at the same distance from the succeeding row of dots. Consequently, any two adjacent rows of dots are at the same distance from each other. Hence, there is a uniform band of white space between any two adjacent rows of dots. It should be noted that dot placement in present day inkjet printers is consistent enough that this uniform band of white space is maintained even in more than one pass print mode.

In any case, any small dot placement errors and dot shape variations that impinge on this band of white space create a hue or saturation shift. This hue or saturation shift is often referred to as banding since it exhibits itself as a visible band. This phenomenon is more discernible when printing graphic images.

One way to address banding effects is to eliminate altogether print mechanism errors such as feed errors, nozzle to nozzle dot placement errors, shape variations and the like that foster dot placement errors and dot shape variations. To do so, however, requires the use of very sophisticated programming techniques and precisely engineering mechanical parts. This is an expensive endeavor which is often times reflected in the price of the printer thus built. Therefore, instead of attempting to eliminate these print mechanism errors, a less expensive method is to distribute these errors in such a way as to minimize their conspicuousness (i.e., to hide the errors).

One method that has been used to distribute these errors is to increase the number of swath passes. That is, since sophisticated programming techniques and precisely engineering mechanical parts are not used, line feed errors, nozzle to nozzle dot placement errors, shape variations etc. do occur, albeit very minimally, at each swath pass. The higher the number of passes, therefore, the more prevalent these errors and; consequently, the less uniform the dot pitch (i.e., more and more of the dots appear to impinge on the band of white space). After a certain number of passes (this number is dependent on a particular style of printer), so much of the band of white space is impinged upon, that it ceases to exist. Banding is thus effectively eliminated.

There are a few disadvantages associated with the above-described method. For example, as is obvious, the higher the number of swath passes that are used in printing a page, the slower the printer. Furthermore, the placement of the dots in the band of white space is unpredictable.

Accordingly, it would be beneficial to develop a method that distributes mechanical printing errors in a known and predictable fashion over the band of white space without affecting printer speed and cost.

SUMMARY OF THE INVENTION

To overcome the limitations in the prior art described above, and to overcome other limitations that will become apparent upon reading and understanding the present specification, the present invention is embodied in a printing system for improving the edge quality of ink drops produced by an inkjet printer.

The need in the art is addressed by the present invention. The present invention provides an inkjet printer with the requisite technology to reduce or eliminate altogether banding effects. The inkjet printer includes an input tray for storing print media, an output area for holding printed media and an inkjet pen or printhead for printing information on the print media. In a preferred embodiment, the inkjet pen scans and ejects ink on the print media with a non-uniform dot pitch. This non-uniformity is achieved by adding visual noise in a known and predictable fashion to the uniform dot pitch.

BRIEF DESCRIPTION OF THE DRAWINGS

The present invention can be further understood by reference to the following description and attached drawings that illustrate the preferred embodiment. Other features and advantages will be apparent from the following detailed description of the preferred embodiment, taken in conjunction with the accompanying drawings, which illustrate, by way of example, the principles of the invention.

DETAILED DESCRIPTION OF THE PREFERRED EMBODIMENTS

In the following description of the invention, reference is made to the accompanying drawings, which form a part hereof, and in which is shown by way of illustration a specific example in which the invention may be practiced. Other embodiments may be utilized and structural changes may be made without departing from the scope of the present invention.

I. General Overview

The present invention reduces print quality and image quality sensitivity to dot placement errors and dot shape variations in an inkjet printer by deliberately introducing low spatial frequency dot placement variations, heretofore referred to as red noise, across the printhead of the system. The red noise is introduced by sinusoidally varying the dot pitch of the printer. The sinusoidal introduction of red noise across the printhead has the effect of distributing dots in the print medium axis (i.e., axis of print medium advance) and thus fills in the band of white space between dot rows. This makes the system more robust to dot placement and shape variations.

II. Detailed Operation of the Invention

Figure 1:
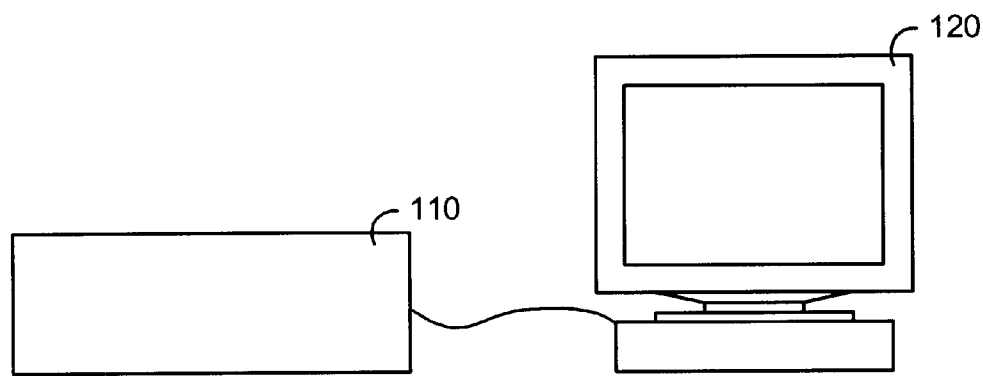
FIG. 1 depicts a block diagram of an inkjet printer connected to a workstation.
Figure 2:
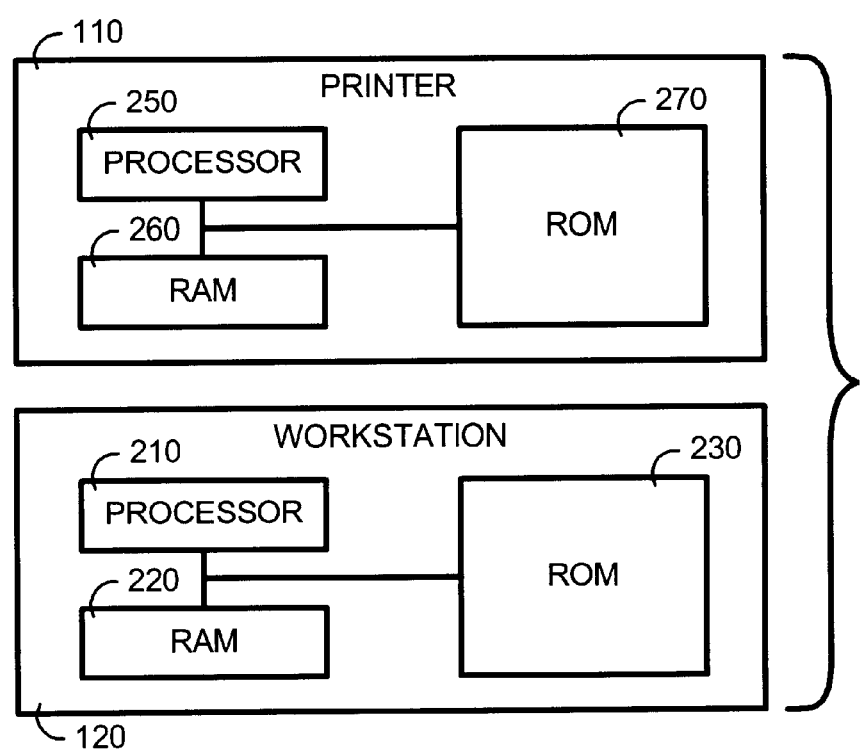
FIG. 2 illustrates particular aspects of the printer and the workstation.

With reference now to the figures, FIG. 1 depicts a block diagram of an inkjet printer 110 connected to a workstation 120. This invention may also be implemented in other types of printers, such as thermal printers, bubble jet printers etc. Further, although the invention is described in the context of printers, it may also be used in conjunction with other image reproduction systems such as copiers, scanners and the like. In one embodiment, the printer 110 includes a controller 130 that has several operations for reducing banding effects. A first operation 132 includes minimizing banding effects across an entire print swath by adding visual periodic noise to a uniform dot pitch to render the dot pitch non-uniform, then superimposing the visual noise as a sinusoidal wave form with a period on the uniform dot pitch and finally corresponding a measurement value of the sinusoidal wave form to the number of nozzles used to print one swath. A second operation 134 includes performing the first operation using bore concentricity for dot placement of the non-uniform dot pitch. A third operation 136 includes performing the first operation using resistor orifice (R/O) misalignment for dot placement of the non-uniform dot pitch. A fourth operation 138 includes performing the first operation using counter bore misalignment for dot placement of the non-uniform dot pitch. These operations will be discussed in detail below.

As is well known in the field, the workstation 120 has at least one processor 210 to process data, including printing data. The workstation 120 also has a system memory 220 (e.g., RAM) that holds data that is to be immediately used by the processor 210 and a storage system 230 (e.g., ROM, hard disk, floppy disk, CD-ROM etc.) to store application programs. One such application program is a printer driver that is used to control the printer 110.

The printer 110 itself has a processor 250, a volatile memory 260 (e.g., RAM) and a non-volatile memory 270 (e.g., ROM, flash etc.). The processor 250 is used to control all moving mechanical parts of the printers. Just as in the case of the workstation 120, the volatile memory 260 is used to hold data for the immediate use of the processor 250. The non-volatile memory 270 is used to store, among other programs, the present invention.

Figure 3:
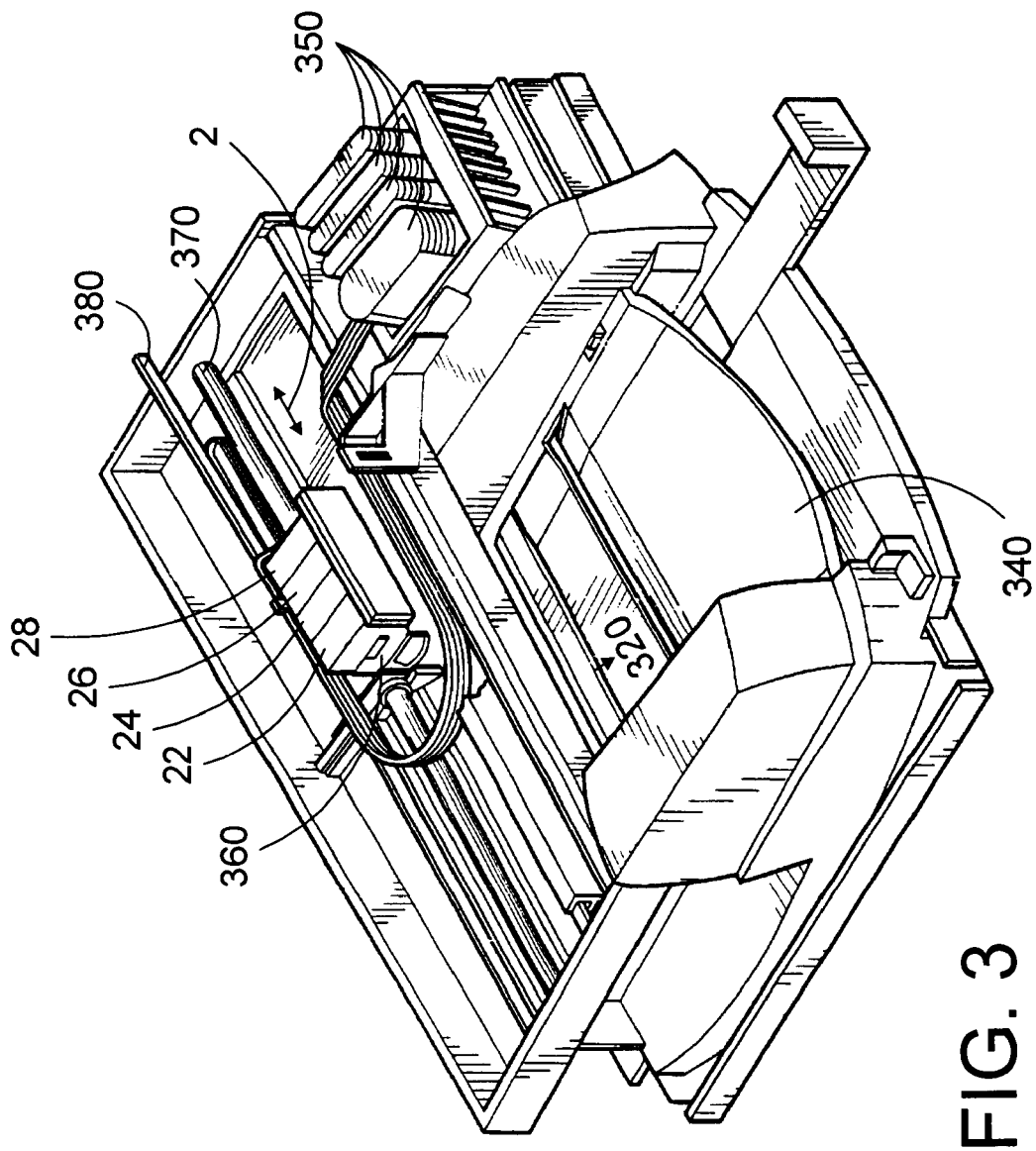
FIG. 3 is a perspective view of the inkjet printer.

However, before delving into the present invention, a brief description of an inkjet printer is needed. FIG. 3 is a perspective view of the inkjet printer 110. The printer 110 has an input tray 310 containing sheets of print medium which pass through a printing zone and along a print medium advance direction 320, past an exit 330 into an output tray 340. Electronics control 350 for commanding the processor 250 to perform various functions are included.

A movable carriage 360 holds print cartridges 22, 24, 26 and 28 which respectively hold yellow (Y), magenta (M), cyan (C) and black (B) inks and dispense these inks upon command from the processor 250. The back of the carriage 360 has multiple bushings (not shown) which ride along a slide rod 370, enabling bidirectional movement of the carriage along the rod 370.

The carriage 360 thus moves along a carriage scanning direction 2, above a sheet of print medium upon which an image is being formed by print cartridges 22–28. The position of the carriage 360, as it traverses the print medium back and forth, is determined by an encoder strip 380. This very accurate positioning device enables selective firing of the various ink nozzles on each print cartridge at the appropriate times during each carriage scan to form the image.

With each scan or swath pass of the carriage 360, the print medium is advanced incrementally in the direction 320 along the print medium axis. These incremental advances allow for the distribution of dots in the band of white space.

Figure 4:
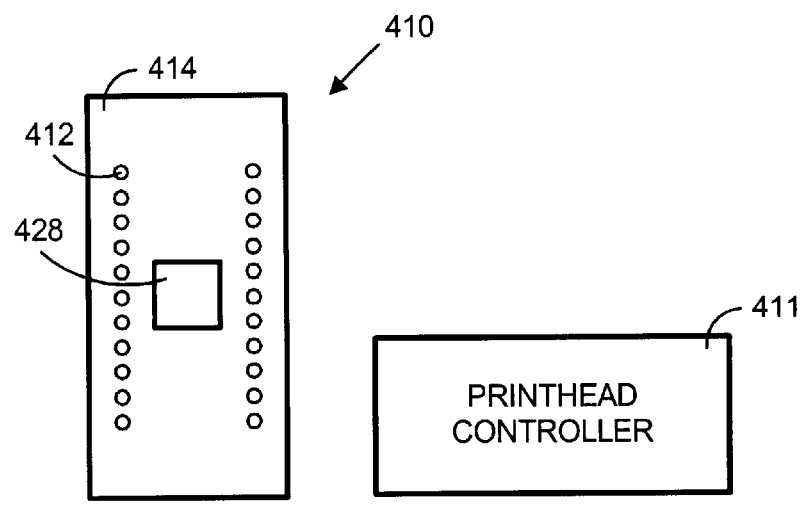
FIG. 4 depicts a thermal inkjet printhead and a printhead controller.

FIG. 4 depicts a thermal inkjet printhead 410 and a printhead controller 411. The printhead 410 includes a plurality of nozzles 412 and is part of an inkjet pen (not shown) used for printing ink onto a media sheet. Although two columns of nozzles are displayed, more columns of nozzles may be used. Along with the nozzles, a temperature sensor 428 is shown. The temperature sensor is used to measure the temperature of the printhead 410. The printhead controller 411 is connected to printhead 410 and monitors the temperature sensor 428.

Figure 5:
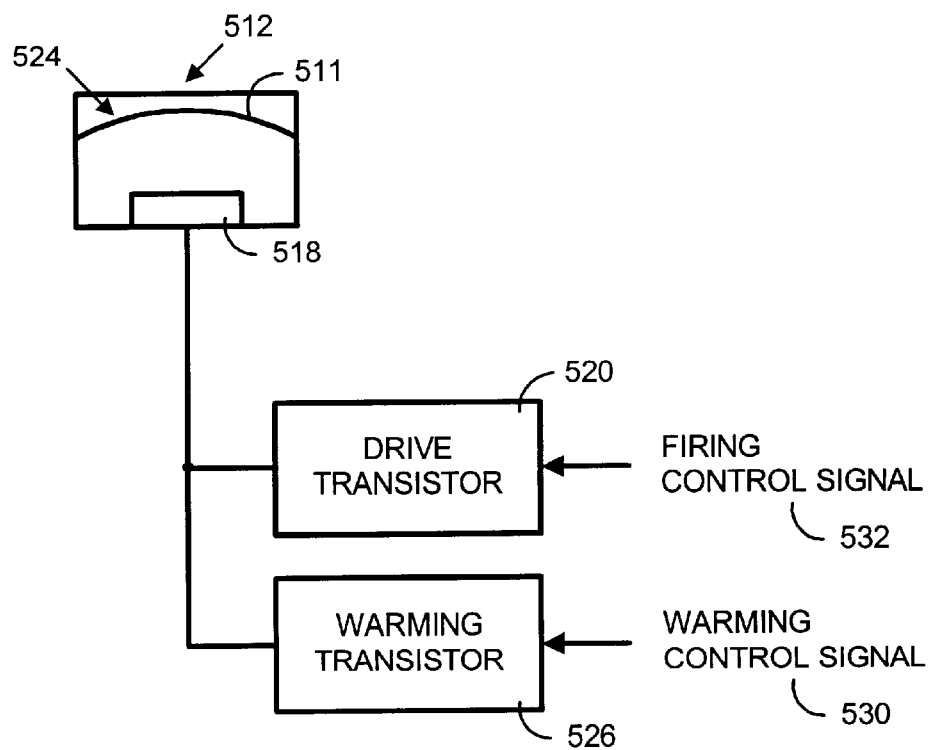
FIG. 5 illustrates one of a plurality of nozzles of the present invention.

FIG. 5 illustrates one of a plurality of nozzles used in the present invention. As shown in FIG. 5, each nozzle includes a nozzle chamber 516 for holding ink 511 and a heating resistor 518. In operation, the heating resistor 518 receives a firing pulse from drive transistor 520 causing the heating resistor 518 to heat up the ink 511 in the chamber 516 to ejection temperature in order to eject the ink through orifice 524. For each nozzle, there is a corresponding nozzle chamber 516, heating resistor 518, drive transistor 520 and heating transistor 526. Although two transistors are used (one to pre-heat and one to drive resistor 518), the use of one transistor is perfectly within the scope of the present invention. In that case, the one transistor can fire less pulse current to pre-heat resistor 518 and more pulse current to drive resistor 518.

Figure 6:
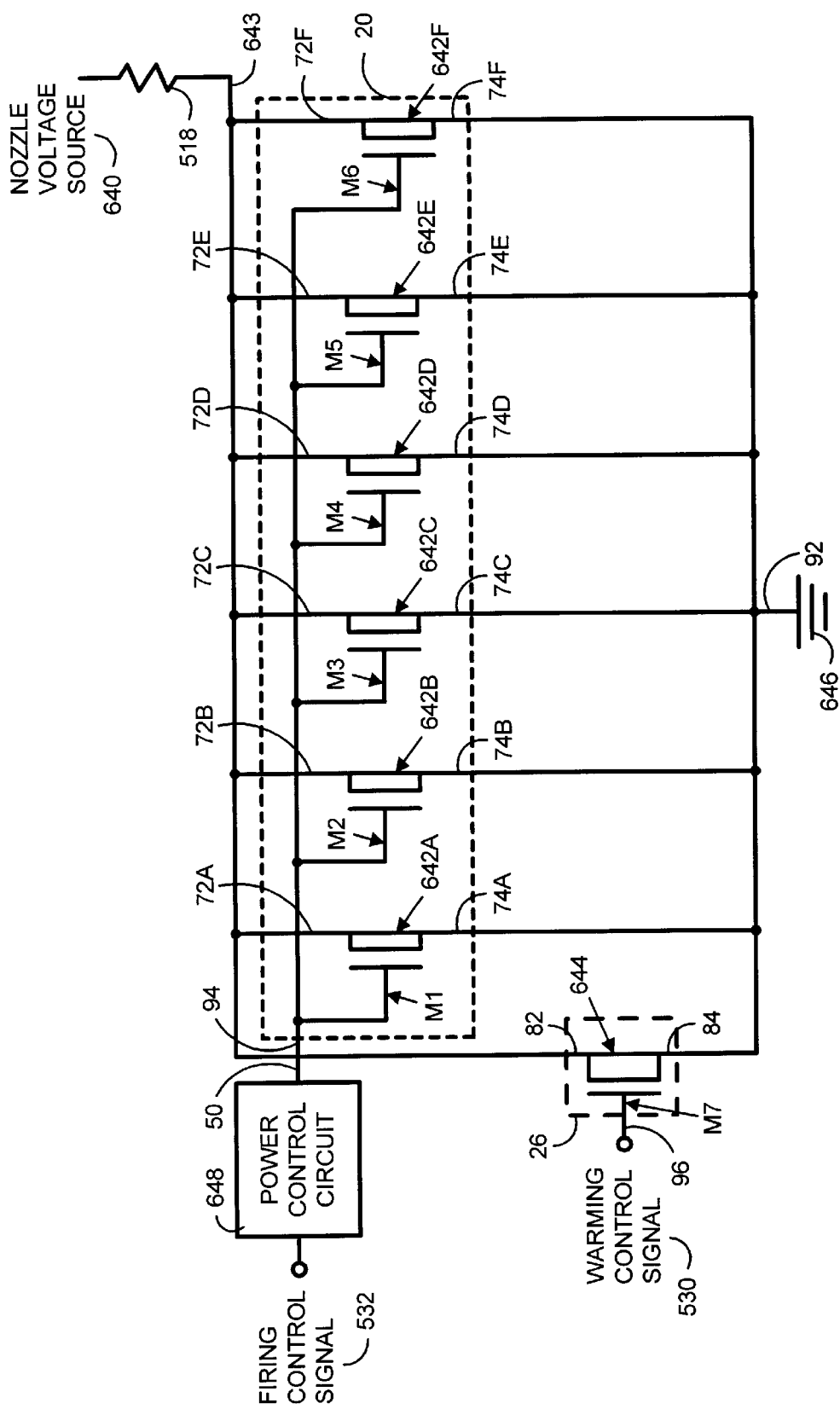
FIG. 6 is a schematic diagram of the nozzle circuitry associated with a given nozzle.

FIG. 6 is a schematic diagram of the nozzle circuitry associated with a given nozzle 412. The heating resistor 518 is coupled to a nozzle voltage source 640 at one contact point and to the drains of the drive transistor 520 and warming transistor 526 at another contact point. The drive transistor 520 is formed by one or more power field effect transistor (FET) devices 642. In the embodiment illustrated six FETs 642a–642f formed the drive transistor 520. The warming transistor 526 is formed by a smaller FET device 644.

The drains of the FET devices 642 and 644 are coupled in common to the heating resistor 518 via an interconnect 643. The sources of the devices 642 and 644 are coupled in common to ground 646. The gates M1–M6 of the FET devices 642a–642f are coupled to a power control circuit 648, which receives the firing control signal 532. The gate M7 of the warming transistor device 644 is coupled to the printhead controller 411 for receiving the warming control signal 530.

Figure 7:
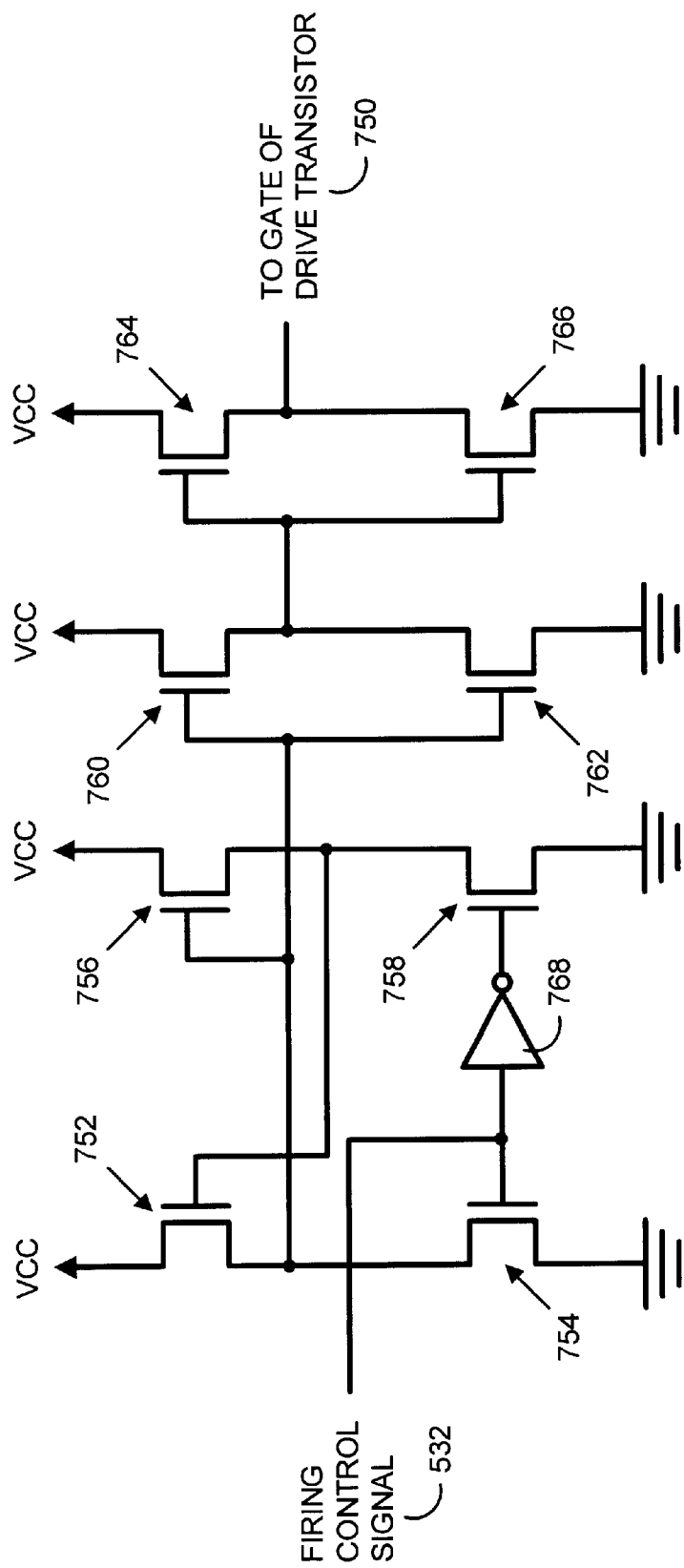
FIG. 7 is a schematic diagram of a power control circuit.
Figure 8:
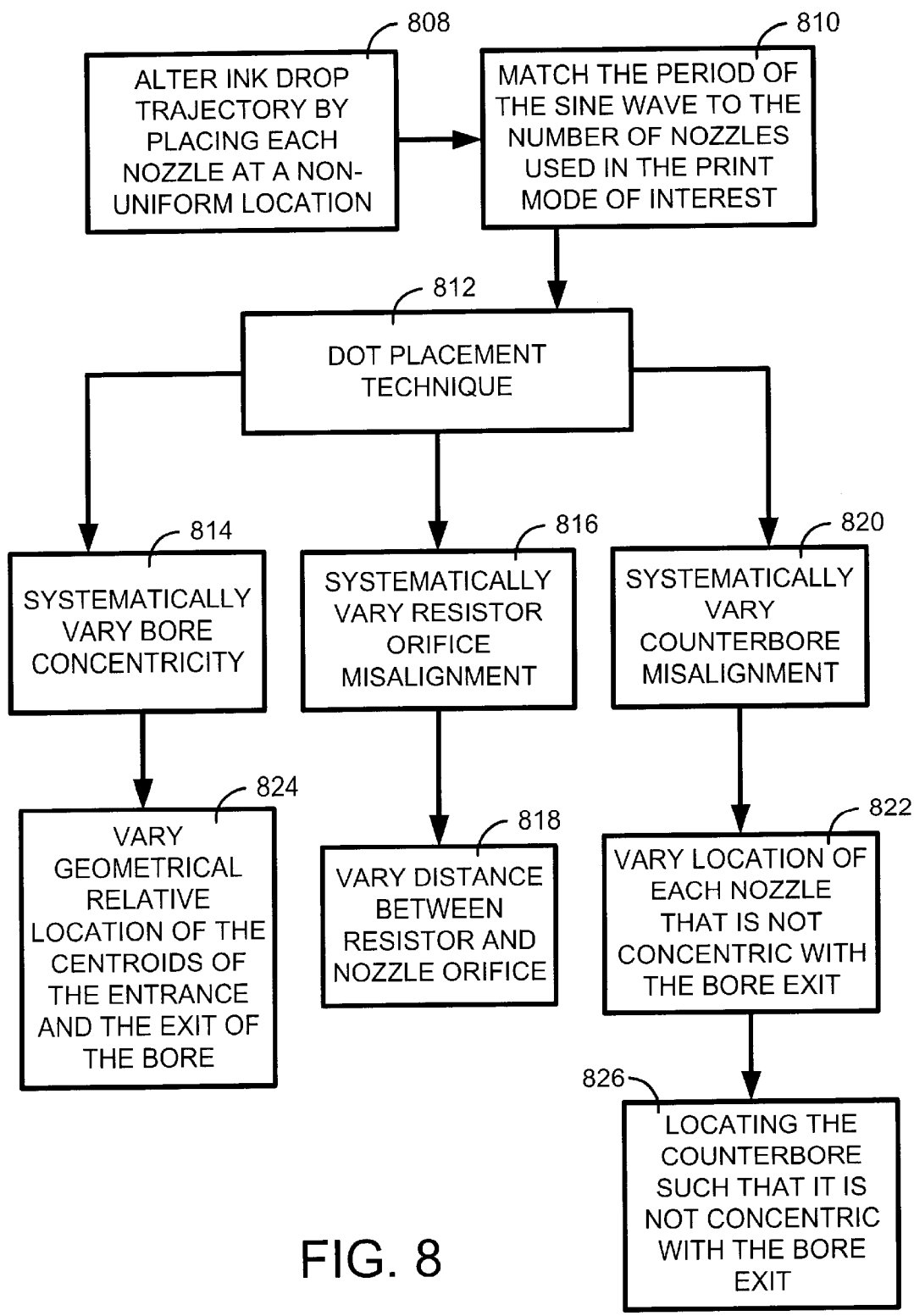
FIG. 8 depicts a block/flow diagram of various dot placement embodiments that can be used with the present invention.

FIG. 7 is a schematic diagram of the power control circuit 648. The power control circuit 648 is formed by a set of current booster circuits. A firing control signal is received from the printhead controller 411. The signal is boosted to generate a signal 750 input to the gates M1–M6 of the drive transistor devices 642. In the illustrated embodiment, the power control circuit includes eight FET devices 752–766 and an inverter 768.

The firing control signal 532 is active when a logic low is received at the power control circuit 648. The logic low is inverted at inverter 768 resulting in a logic high signal 750 output from the power control circuit 648 into the gates M1–M6 of the drive transistor devices 642. Referring again to FIG. 6, the gates M1–M6 allow current flow through the devices 642. Specifically, current flows from the nozzle voltage source 640 through the heating resistor 518 into the drains 72a–74f to ground 46. When an inactive signal (e.g., a logic high) is received at power control circuit 648, signal 750 is a logic low. Thus, the junction from drain to source at drive transistor devices 642a–642f is closed.

When an active signal level is received at the warming transistor device 644, gate M7 enables current flow through the device 644. Specifically, current floes from the nozzle voltage source 640 through the heating resistor 518 into the drain 82 and out through the source 84 of the warming transistor 644 to ground 646. When an inactive signal level is received at the gate M7 of the warming transistor device 644, the junction from drain 82 to source 84 is closed.

The warming control signal 530 and the firing control signal 532 are separate signals having separate signal paths. To generate a warming pulse, the firing control signal 532 is inactive and the warming control signal is active. Thus, a small current flows from the nozzle voltage source 640 through the heating resistor 518 into the drain 82 and out the source 84 of the warming transistor 644 to ground 646. The current flowing through the heating resistor 518 is based upon the size of the transistor device 644. Such current is insufficient to cause the nozzle 412 to fire. Warming transistor device 644 is used as a switching device turning the current flow through the device 644 on or off. The current magnitude for a warming pulse may be between 2.0 and 3.5 mA; and the nozzle voltage around 21 volts.

To generate a firing pulse, the warming control signal 530 is inactive and the firing control signal is active. Thus, current flows from the nozzle voltage source 640 through the heating resistor 518 into the drains 72a–72f and out of the source 74a–74f to ground 646. The current flowing through the heating resistor 518 is based upon the number and size of the transistor devices 642a–642f. Such current is enough to cause a nozzle 412 to fire. The current magnitude for a firing pulse may be around 300 mA and the nozzle voltage source around 21 volts.

Obviously, other voltage and current levels may be used in alternative embodiments. Furthermore, to fire a nozzle 412 both a firing signal 532 and a warming signal 530 may be active so that current flows from the nozzle voltage source 640 through the heating resistor 518 and through all the devices 642 and device 644 to ground 646.

When both the firing control signal 532 and the warming control signal 530 are inactive, current does not flow through the devices 642 and 644. Consequently, current does not flow through the heating resistor 518.

As mentioned above, the invention includes sinusoidally varying the dot pitch of the inkjet printer. This sinusoidal variation of the dot pitch introduces a low frequency of dot placement variations. The sinusoidal introduction of the red noise is achieved by altering the location of each ink drop on the media from each nozzle. This can be accomplished, for example, by a constant nozzle pitch and varying trajectory, with constant trajectory and varying nozzle pitch or some combination thereof. Ink drops from one nozzle can be retarded (i.e., trajectory is altered such that the ink drop falls on the print media at a location lower than where they would have normally fallen on the print media) or advanced (i.e., trajectory is altered such that the ink drop falls on the print media at a location higher than where they would have normally fallen on the print media).

There are many ways of altering the trajectory of the ink drops (box 808). For example, the nozzle pitch itself may be altered (e.g., each nozzle may be placed at a non-uniform location to ensure that ink droplets from the nozzle are placed at the desired location on the print media). Also, the period of the sine wave can match the number of nozzles used in the print mode of interest (box 810). The alteration of the trajectory (box 808) may be further accomplished with various dot placement techniques (box 812), such as by systematically varying bore concentricity (box 814), resistor orifice misalignment (box 816) (i.e., distance between resistor and nozzle orifice (box 818)), counterbore misalignment (box 820) (e.g., locating each nozzle not concentric with the bore exit (box 822)) etc., or by any combination thereof. In the present invention, the trajectory of the ink drops is altered by using a non-uniform nozzle itch.

It should be noted that the term concentricity as used above refers to a geometrically relative location of the centroids of the entrance and the exit of the bore (box 824). Also, the term counterbore misalignment as used above refers to locating the counterbore (usually a circular feature) such that it is not concentric with the bore exit (box 826). The counterbore misalignment does not relate to the depth of the counterbore.

In the present invention, a 3 um amplitude sine wave is superimposed over a uniform dot pitch of 42 um. A 42 um dot pitch translates into a 600 dots per inch (dpi) pitch. The period of the sine wave is chosen to be 256 to match the number of nozzles used in the print mode of interest (box 810). However, the period need not match the number of nozzles. When the period of deviation is matched with the number of nozzles used, each dot row is printed using nozzles with a variety of deviations from the average dot pitch. This ensures uniformity of tone and maximizes the benefit of the invention.

As the deviation from the average dot pitch varies continuously, the distance between adjacent nozzles varies only slightly across the printhead. This is highly desirable since it will not create defects in print modes that use only a small number of passes.

III. Advantages of the Invention

The advantages of the present invention are many. First, it introduces visual noise into an image in a known and predictable fashion, allowing for the signature of that noise to be engineered along with the printing system. Second, the invention does not require additional passes to eliminate banding effects. For example, it has been shown that relying on line feed errors, nozzle to nozzle dot placement errors, shape variations etc. requires a twelve-pass print mode to achieve an equivalent white space saturation of the eight-pass print mode of the present invention. Hence, the present invention, in some instances, enhances the speed of printers that have decreased or eliminated banding effects. Third, since the use of the invention covers the white space creating the banding sensitivity without increasing dot size, grain is not increased.

IV. Conclusion

The description of the present invention has been presented for purposes of illustration and description, but is not intended to be exhaustive or limited to the invention in the form disclosed. Many modifications and variations will be apparent to those of ordinary skill in the art. Therefore, the foregoing description should not be taken as limiting the scope of the invention defined by the appended claims.

The foregoing has described the principles, preferred embodiments and modes of operation of the present invention. However, the invention should not be construed as being limited to the particular embodiments discussed. As an example, the above-described inventions can be used in conjunction with inkjet printers that are not of the thermal type, as well as inkjet printers that are of the thermal type. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for reducing banding effects in an inkjet printer comprising:

minimizing banding effects across an entire print swath by adding visual periodic noise to a uniform dot pitch to render the dot pitch non-uniform, wherein dot placement of the non-uniform dot pitch is via bore concentricity;

superimposing the visual noise as a sinusoidal wave form with a period on the uniform dot pitch; and corresponding a measurement value of the sinusoidal wave form to the number of nozzles used to print one swath.

2. The method of claim 1 wherein dot placement of the non-uniform dot pitch is via resistor orifice misalignment.

3. The method of claim 1 wherein dot placement of the non-uniform dot pitch is via counter bore misalignment.

4. The printer of claim 1 wherein dot placement of the non-uniform dot pitch is via bore concentricity, resistor orifice misalignment and counter bore misalignment.

5. An image reproduction system for reducing banding effects comprising:

an input tray for holding print media;

a printhead having a plurality of nozzles for printing on the print media, the nozzles adapted to minimize banding effects across an entire print swath by placing ink droplets in a non-uniform fashion on the print media as visual periodic noise having a sinusoidal wave form with a period superimposed on a uniform dot pitch to eliminate white space banding, wherein a measurement value of the sinusoidal wave form corresponds to the number of nozzles used to print one row of dots, wherein dot placement of the non-uniform dot pitch is via resistor orifice misalignment; and actuators for moving the print media from the input tray to the printhead to be printed on.

6. The printer of claim 5 wherein dot placement of the non-uniform dot pitch is via bore concentricity.

7. The printer of claim 5 wherein dot placement of the non-uniform dot pitch is via counter bore misalignment.

8. The printer of claim 5 wherein dot placement of the non-uniform dot pitch is via a combination of bore concentricity, resistor orifice misalignment and counter bore misalignment.

9. A method for reducing banding effects in a fluid ejection device of a printing system comprising:

adding visual periodic noise to a uniform dot pitch to render the dot pitch non-uniform so that the banding effects across an entire print swath are minimized, wherein dot placement of the non-uniform dot pitch is via counter bore misalignment;

superimposing the visual noise as a sinusoidal wave form with a period on the uniform dot pitch; and matching a measurement value of the sinusoidal wave form to a number of nozzles used to print one swath.

* * * * *

UNITED STATES PATENT AND TRADEMARK OFFICE
CERTIFICATE OF CORRECTION

PATENT NO. : 6,629,751 B2
DATED : October 7, 2003
INVENTOR(S) : Giere et al.

It is certified that error appears in the above-identified patent and that said Letters Patent is hereby corrected as shown below:

Column 7,
Line 35, delete "printer" and insert therefor -- method --.

Signed and Sealed this

Seventeenth Day of August, 2004

JON W. DUDAS
*Acting Director of the United States Patent and Trademark Office*